United States Patent
Paliwal et al.

(10) Patent No.: US 9,291,206 B2
(45) Date of Patent: Mar. 22, 2016

(54) APPLIANCE DRIVE COUPLER

(71) Applicant: Electrolux Home Products Pty Limited, New South Wales (AU)

(72) Inventors: Vijay Paliwal, Orange (AU); Colin Grant, Melbourne (AU)

(73) Assignee: Electrolux Home Products Pty Limited, New South Wales (AU)

( * ) Notice: Subject to any disclaimer, the term of this patent is extended or adjusted under 35 U.S.C. 154(b) by 0 days.

(21) Appl. No.: 14/146,993

(22) Filed: Jan. 3, 2014

(65) Prior Publication Data

US 2014/0206462 A1    Jul. 24, 2014

Related U.S. Application Data

(63) Continuation of application No. 13/989,269, filed as application No. PCT/AU2011/001517 on Nov. 24, 2011, now abandoned.

(30) Foreign Application Priority Data

Nov. 24, 2010    (AU) ................................ 2010905204

(51) Int. Cl.
    *F16D 3/18*    (2006.01)
    *F16D 1/10*    (2006.01)
    *F25C 5/00*    (2006.01)

(52) U.S. Cl.
    CPC ................ *F16D 1/101* (2013.01); *F25C 5/005* (2013.01)

(58) Field of Classification Search
    CPC .................................. F16D 1/101; F25C 5/005
    USPC ................... 464/149, 157, 901; 403/43, 340; 62/381; 416/237
    See application file for complete search history.

(56) References Cited

U.S. PATENT DOCUMENTS

| | | | | |
|---|---|---|---|---|
| 666,144 A * | 1/1901 | Kennedy | ........................ | 464/149 |
| 1,799,745 A * | 4/1931 | Gunn | ............................ | 416/237 |
| 2,412,068 A * | 12/1946 | Spader | ........................ | 62/381 X |
| 3,529,440 A | 9/1970 | Bauer | | |
| 3,930,380 A | 1/1976 | Fogt | | |
| 4,993,992 A | 2/1991 | Kriegel | | |
| 5,911,505 A | 6/1999 | St John et al. | | |
| 6,106,232 A * | 8/2000 | Wagner | ..................... | 416/237 X |
| 7,017,363 B2 * | 3/2006 | Lee et al. | | |

OTHER PUBLICATIONS

International Search Report mailed Mar. 7, 2012 in corresponding International Application No. PCT/AU2011/001517.

* cited by examiner

*Primary Examiner* — Gregory Binda
(74) *Attorney, Agent, or Firm* — Banner & Witcoff, Ltd.

(57) ABSTRACT

A coupler 001 has a central section 006 with a rotation axis 007 and arms 003 which extend away from said central section 006. The arms 003 are in an offset location relative to a diametrical line 060. A portion 004 of the arms 003 meets or passes through or extends along a plane formed through the diametrical line 060 and the rotation axis 007. Also included is an appliance using such couplers and a drive mechanism using such couplers.

18 Claims, 10 Drawing Sheets

Figure 4
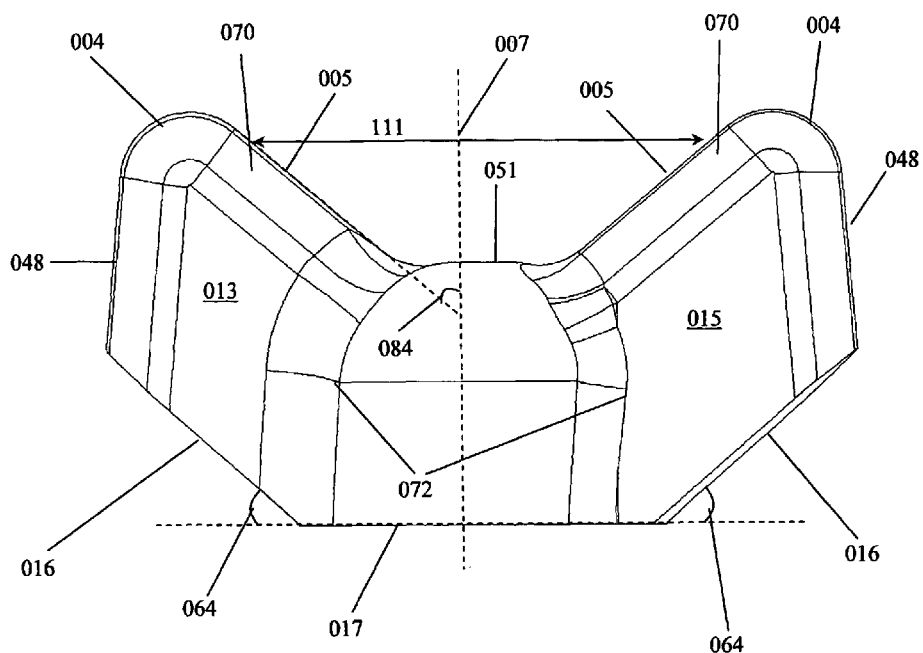
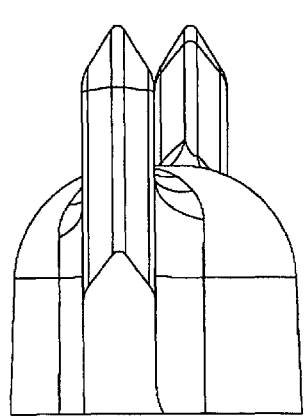
Figure 13
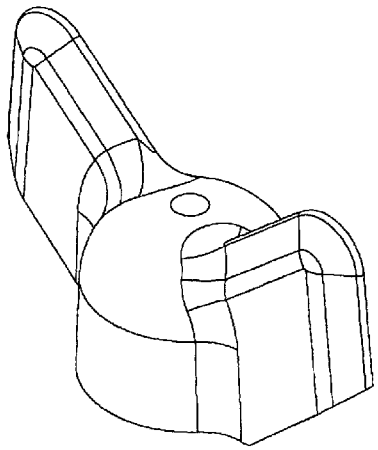
Figure 14 ered components, for example
APPLIANCE DRIVE COUPLER

FIELD OF THE INVENTION

The present invention relates to a drive coupler to drive a motor driven apparatus for an appliance such as a freezer or a refrigerator, or for an auger or ice crusher.

BACKGROUND OF THE INVENTION

In the field of ice and crushed ice dispensers in refrigerators the drive coupling device attaching the motor to the dispenser or crusher includes several different components, for example male and female connections. One problem that can arise when using these different components is that if connecting components are not in their correct mating position, they may have to be adjusted, adding to inconvenience and time. An example of one such a coupling system is described in WO2008/035913, which has a two differently shaped parts to provide the drive and driven coupler.

Any reference herein to known prior art does not, unless contrary indication appears, constitute admission such prior art is commonly known by those skilled in the art to which the invention relates at the priority date of this application.

An object of the present invention is to ameliorate, at least in part, at least one of the problems of the prior art. For example, increasing the range of angles which allow a correct mating position of drive coupler systems should reduce the likelihood of the components having to be adjusted.

SUMMARY OF SELECTED INVENTIVE ASPECTS

In an aspect, the present invention provides a coupler having a central section with a rotation axis and arms extending away from the central section, the arms being in an offset location relative to a diametrical line characterized in that a portion of the arms meet or pass through or extend along a plane formed through the diametrical line and the rotation axis.

The arms are at an angle to the plane or are parallel to the plane.

The arms can have a drive surface on the side of the arms closest to the plane.

The present invention also provides a coupler for driving an appliance, wherein the coupler includes a central section having an axis of rotation, at least two arms that extend in a direction away from the central section offset from a diametrical line through the axis of rotation, each arm including an engagement edge and a space between ends of each arm, the arm includes a drive surface extending from the engagement edge.

The engagement edge can extend to a height from the base of the coupler which is higher than the height of the base to an upper portion of the central section.

The engagement edge can form an angle with the axis of rotation so that a distal end of the engagement edge is at a height from the base of the coupler which is higher than the height from the base of the coupler to a proximal end of the arm.

The arms can be oppositely offset along a diametrical line through the central section on opposite sides of the central section.

The arms can be angled so that an upper edge will lead when the coupler is driven and a base edge of the arms will trail.

The arms can be angled so as to extend away from the central section towards the diametrical line.

The base can be angled relative to the axis of rotation so that a distal end of the base is at a height from the base of the coupler higher than a proximal end of the base.

A first one of the coupler can be used as a drive coupler and a second one of the couplers can be used as a driven coupler on a device to be driven.

In operation the coupler can rotate in the anti-clockwise direction and has a right hand thread through the axis of rotation; or in operation can rotate in the clockwise direction and has a left hand thread through the axis of rotation.

An edge of the arms can be bevelled or chamfered.

An edge of the arms can be laterally radiused.

The coupler can be removably attached to a drive shaft.

The drive coupler can be made from stainless steel or polymeric material or any appropriate material.

The arms when rotating and engaging a like coupler, result in a force vector that has a component directed towards the axis of rotation of the coupler.

The arms when rotating and engaging a like coupler, result in a force vector which will be in a direction that will urge the couplers together.

The present invention also provides an appliance having an ice producing and dispensing system wherein said appliance has a detachable bin and a formation to receive said bin, said bin including thereon a coupler as aforesaid, which engages and is driven by a coupler on said appliance as aforesaid.

The present invention also provides a drive mechanism including couplers as described above, wherein in an operational state the centre sections of both the drive and driven couplers are positioned such that the axes of rotation of both drive couplers are generally aligned; and the drive surfaces of the drive coupler abuts the drive surfaces of the driven coupler so that when operational the driven coupler is rotationally driven by the drive surface of the drive coupler.

The edges of the arms of one coupler can cause rotation of the other coupler, when they engage each other and when there is a misalignment of opposed coupler arms.

The present invention also provides a method of coupling a drive and driven component, the method including providing each of said components with a coupler, so that when said couplers are rotating and engaged, the movement of the drive coupler will result in a force vector on the driven coupler which will be in a direction that will urge said couplers together.

The method can be such that the movement of the drive coupler will result in a force vector that has a component directed towards the axis of rotation of said coupler.

The present invention further provides a coupler being substantially as herein described with reference to the accompanying drawings.

BRIEF DESCRIPTION OF THE DRAWINGS

An embodiment or embodiments of the present invention will now be described, by way of example only, with reference to the accompanying drawings, in which:

FIG. 4 is a front on view of the drive coupler.

FIG. 13 is a plan view of a drive coupler similar to that of FIGS. 1 to 4, with arms which extend generally parallel to the axis of rotation.

FIG. 14 is a perspective view of the coupler of FIG. 13.

Figure 1:
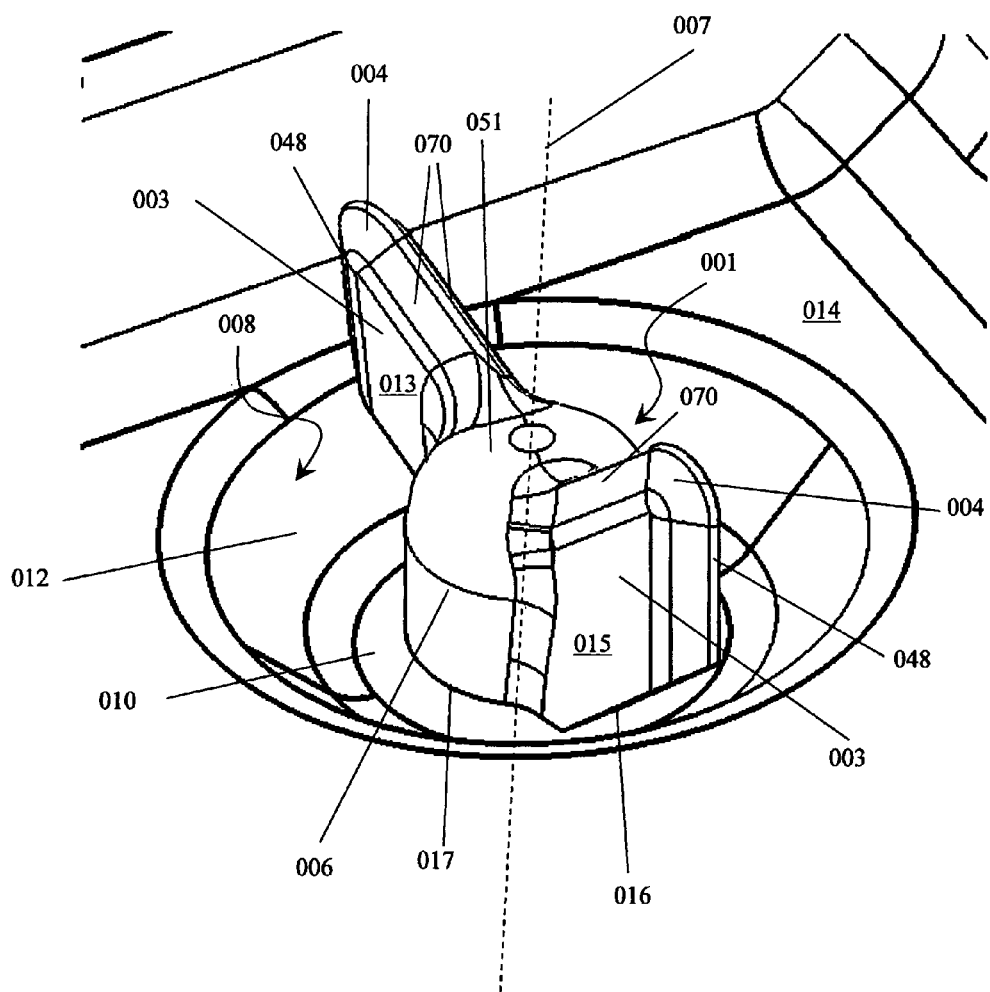
FIG. 1 is a perspective view of the drive coupler.

It is understood that, unless indicated otherwise, the drawings are intended to be illustrative rather than exact representations, and are not necessarily drawn to scale. The orientation of the drawings is chosen to illustrate the features of the objects shown, and does not necessarily represent the orientation of the objects in use.

DETAILED DESCRIPTION OF THE EMBODIMENT OR EMBODIMENTS

FIGS. 1 to 4 illustrate a coupler 001 for use in a drive mechanism for driving an apparatus such as an ice crusher, auger, ice dispenser or other tool collectively known as the device. The coupler 001 connects to a drive shaft of a motor (not shown), or a drive unit and or on a drive shaft on an implement to be driven. The drive coupler and device can be found on a freezer, refrigerator, cool room, refrigeration unit or otherwise which will be collectively known as the appliance.

FIGS. 1 to 4 illustrate an embodiment of this invention where the drive shaft extends through a face of an appliance 014. The skilled addressee will recognise that this need not be the wall of the appliance and can be a part of any other appliance. The face 014 of the appliance through which the drive shaft extends can be located in a door of the appliance, the side wall of the appliance, internally or elsewhere on an appliance. The face 014 can be oriented horizontally, vertically or at any angle between horizontal and vertical depending on the orientation of the driven crusher, auger, dispenser or other appliance.

The coupler 001 includes a central section or hub 006 which rotates around an axis of rotation 007 of the coupler 001 when driven. FIGS. 1 to 4 illustrate the central section or hub 006 as being generally shaped as a cylinder with a hemispherical end. Other shapes can be used, for example the central section or hub can have a cylindrical shape, prismic, dome, pyramidal or a disk shape as illustrated in FIGS. 10 to 13.

Extending radially and axially from the central section 006 of the coupler 001 are two arms 003. They extend generally adjacent to a diametrical line 060 away from the axis of rotation 007. The arms 003 have an engagement edge 005 that extends in the direction of the extension of the arms 003 at an angle 084 away from the axis of rotation 007 towards the diametrical extension of the arms 003, to produce a profile similar to that of a wing nut such that there is a space or void, denoted by double headed arrow 111 in FIG. 4, which exists between the opposite edges 005. In a preferred embodiment angle 084 is 50.24 degrees but an angle between 45 and 70 degrees is expected to be effective. Angle 084 orients engagement edge 005 such that a distal end of engagement edge 005 is at a height from base 017 of coupler 001 which is higher than the height from base 017 of coupler 001 to a proximal end of arm 003. Thus, the distal end of engagement edge 005 extends to a height from the base 017 of coupler 001 that is higher than the height of base 017 of coupler 001 to an upper portion of central section 006 of coupler 001.

Figure 10:
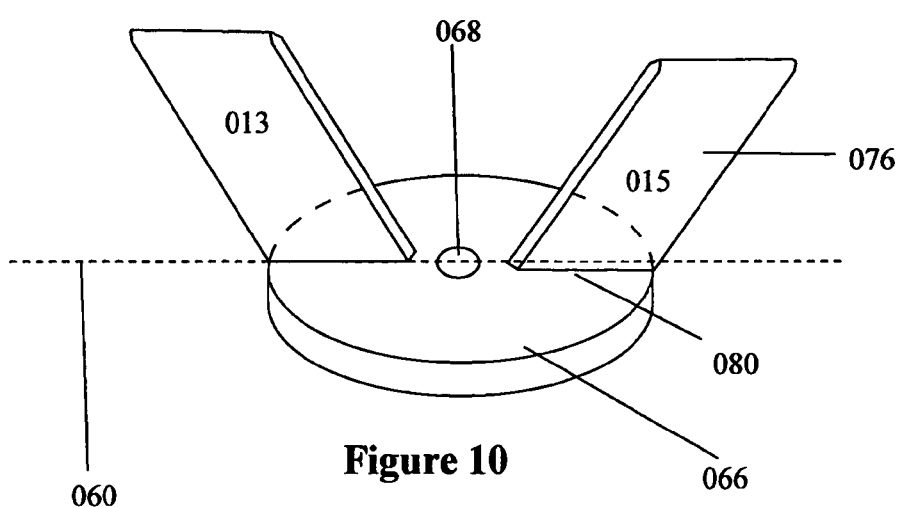
FIG. 10 is a perspective view of a drive coupler similar to that of FIG. 1 with different arms.
Figure 12:
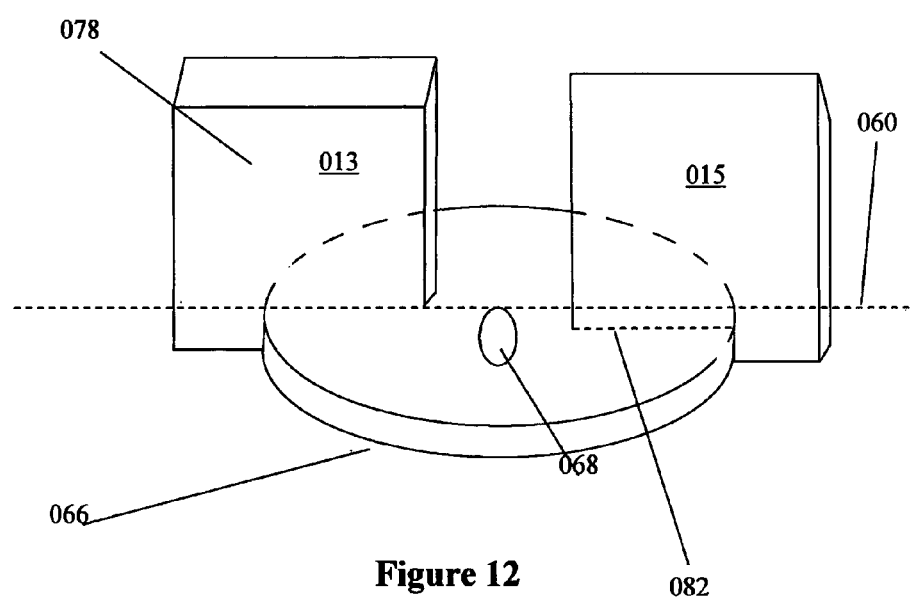
FIG. 12 is a perspective view of a drive coupler with a disk central section and integrally formed arms.

The arms 003 terminate along the engagement edge 005 with a rounded terminus 004. The terminus 004 is rounded in both the direction of the extension of the arms 003, that is, from engagement edge 005 to distal edge 048, and laterally towards the drive surface 013 and following surface 015. The drive surface 013 and following surface 015 extend from the engagement edge 005 to a base 016 in a plane towards the face 014 of the refrigerator on which the coupler 001 is mounted. Base 016 extends parallel to engagement edge 005 so that base 016 also extends at angle 084 relative to axis of rotation 007. The engagement edge 005 has bevelled portions 070 which include a radius to minimise the likelihood of mating coupler engagement edges 005 abutting. If desired the engagement edge 005 can be chamfered as illustrated in FIGS. 10 and 12 and include a radius.

The coupler 001 can be connected to the drive shaft of the motor or gear box by a threaded connection, or keyed in place, or by a locking pin, split pin, bridge pin, lynch pin or in a variety of other ways readily understood by the skilled addressee.

In one embodiment the coupler includes a right hand threaded bore 068 and when driven by the drive shaft rotates in the anti clockwise direction. In another embodiment the drive coupler can include a left hand thread in the central bore 068 and when driven by the drive shaft rotates in the clockwise direction.

Figure 5:
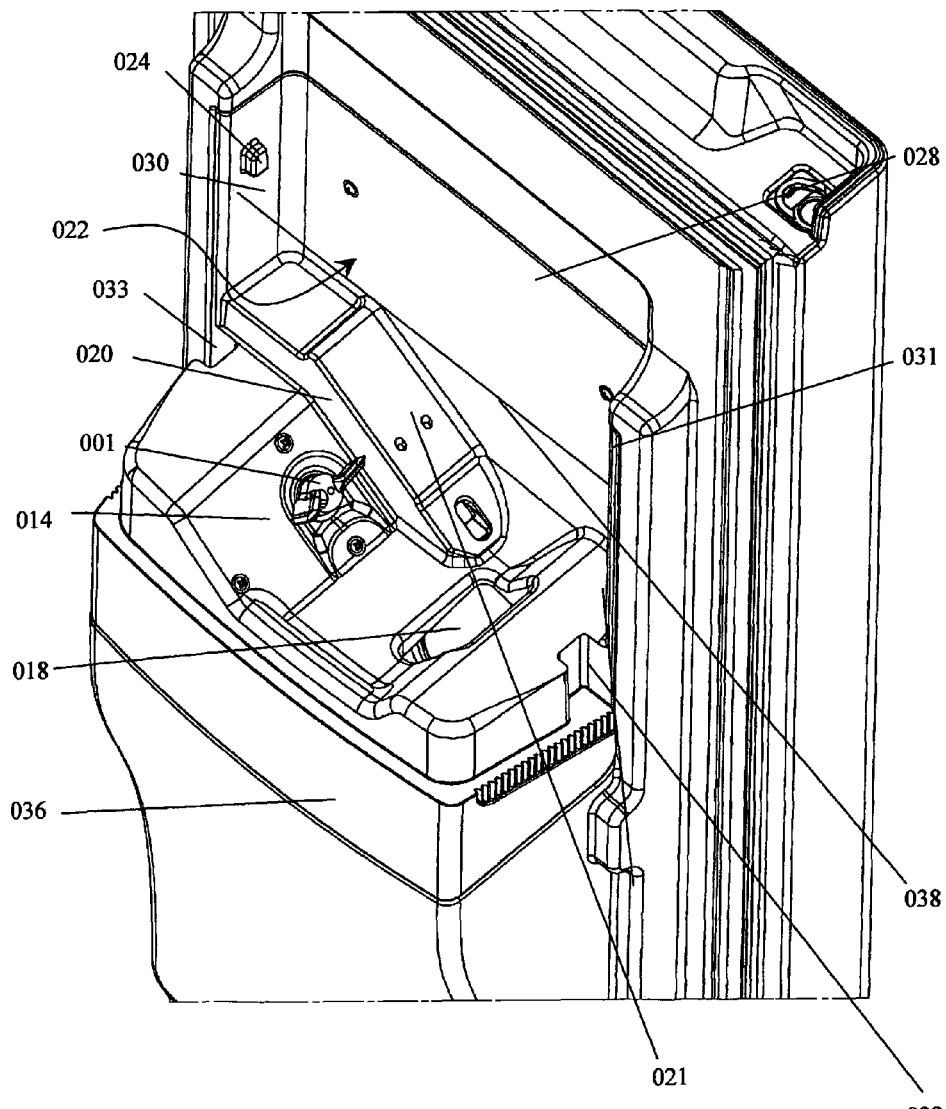
FIG. 5 is a perspective view of a region designed to receive an ice bucket.

The coupler 001 is illustrated in FIGS. 1 and 5 as being mounted in a recess 008. The recess has a base 010 and angled walls 012 which meet the face 014. In this arrangement, the coupler is mounted to the drive shaft via the base 017. The recess 008 is provided so that when a like coupler, attached to a device to be driven, is brought into engagement, a minimal amount of space is used.

Figure 6:
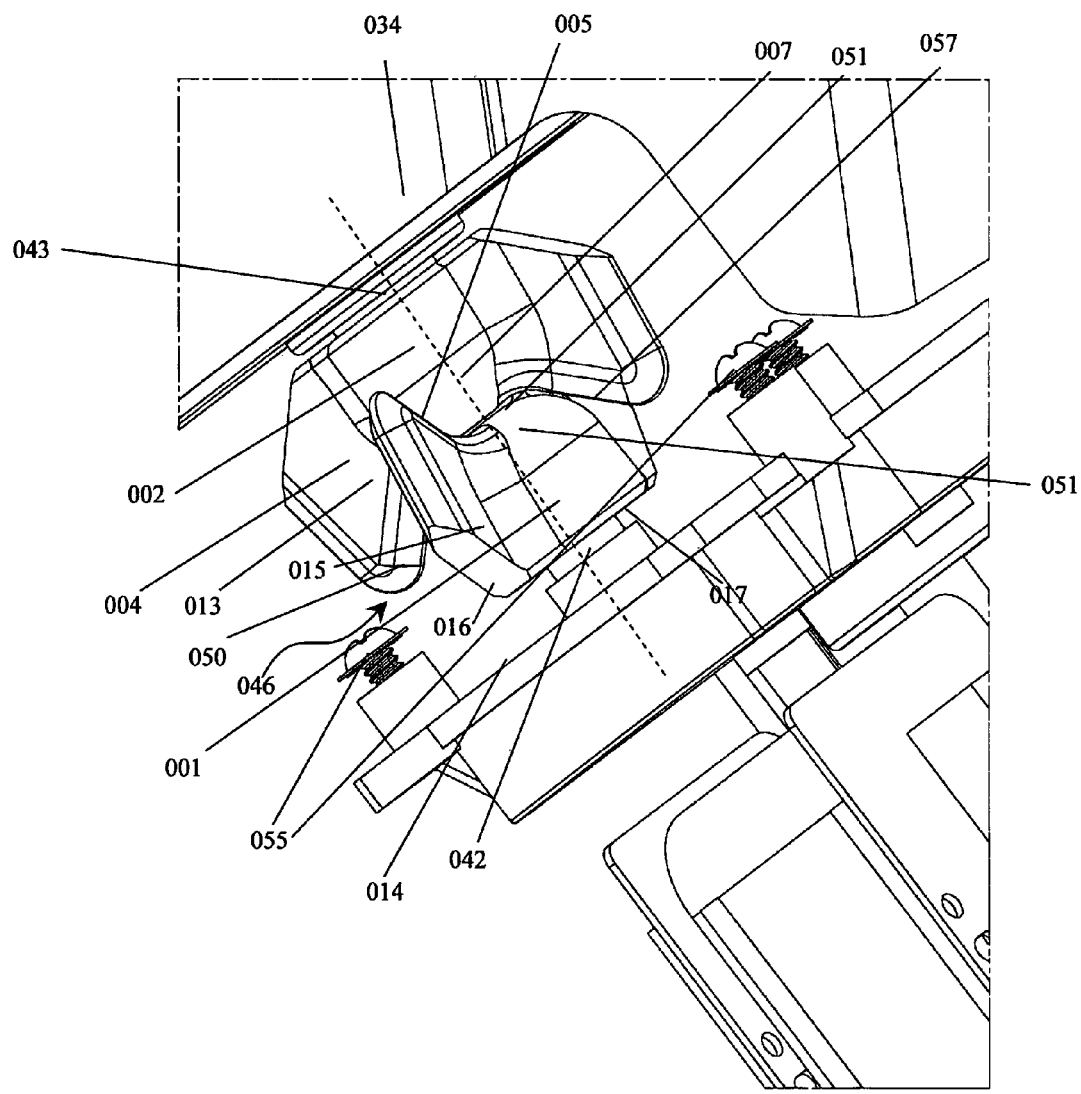
FIG. 6 is a side on view of the drive coupler engaged.

The coupler 001 can be attached to a device to be driven and will be known as the driven coupler 002 in this situation, but it is identical to coupler 001, as in FIG. 6.

Each of the arms 003 are oppositely offset from each other on either side of a bisecting diametrical line 060. Drive surfaces 013 are on the side of arms 003 closest to the plane passing through diametrical line 060 and the axis of rotation 007. By being oppositely offset on either side of the bisecting diametrical line 060 the arms 003 are able to abut the drive surface 013 of one coupler 001 against the drive face 013 of a driven coupler 002 when the two are mated as is illustrated in FIG. 6. This allows a maximum area of drive surfaces 013 to abut each other.

Figure 2:
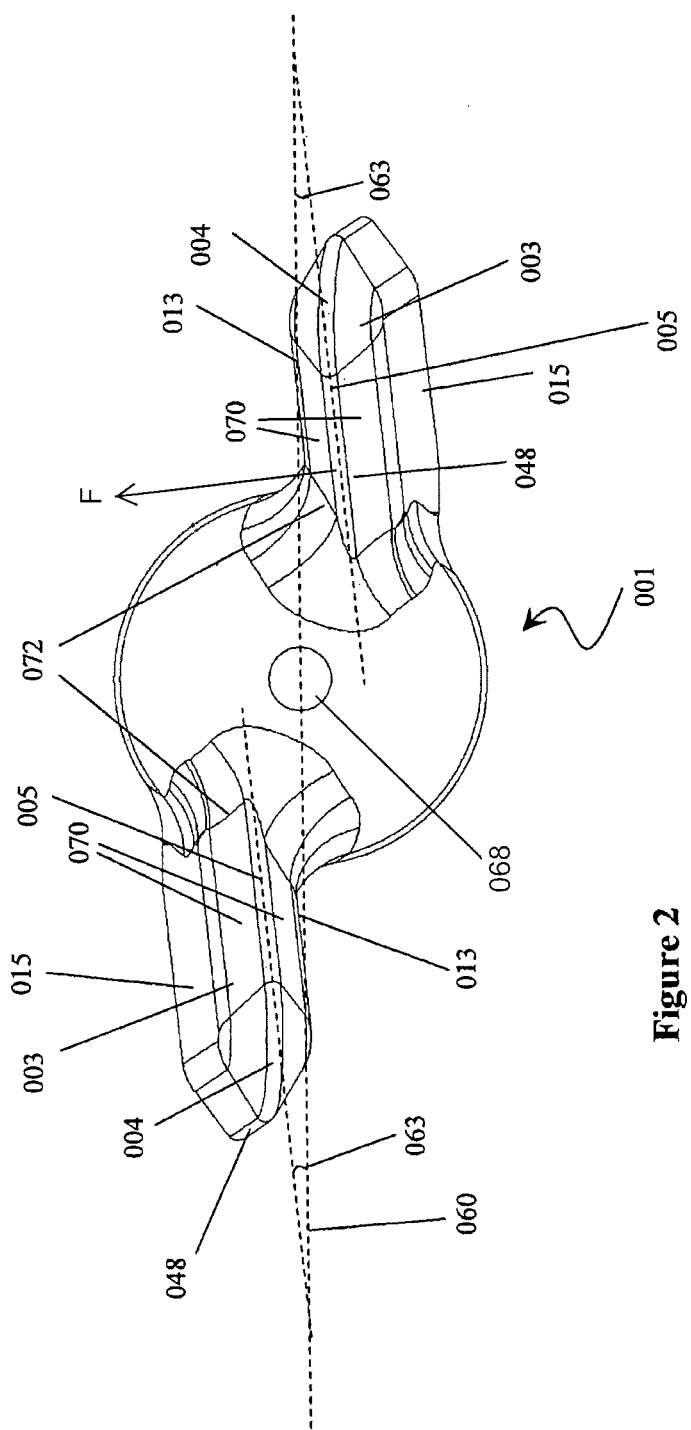
FIG. 2 is a top down view of the drive coupler.

As seen in FIG. 2, the arms 003 are at an acute angle 063 to the diametrical line 060 so as to make distal edge 048 of the arm lead ahead of the proximal edge 072 of the arms when rotating. In one embodiment the angle 063 is 6.25 degrees but an angle in the range of 5 degrees to 15 degrees would be sufficient, with an angle up to 30 degrees being envisaged. With the angle 063 at least the distal edge 048 will meet or pass through a plane that passes through the bisecting diametrical line and the axis of rotation. When the coupler 001 is rotating this angle 063 results in a force vector F that has a component directed towards the axis of rotation 007.

Figure 3:
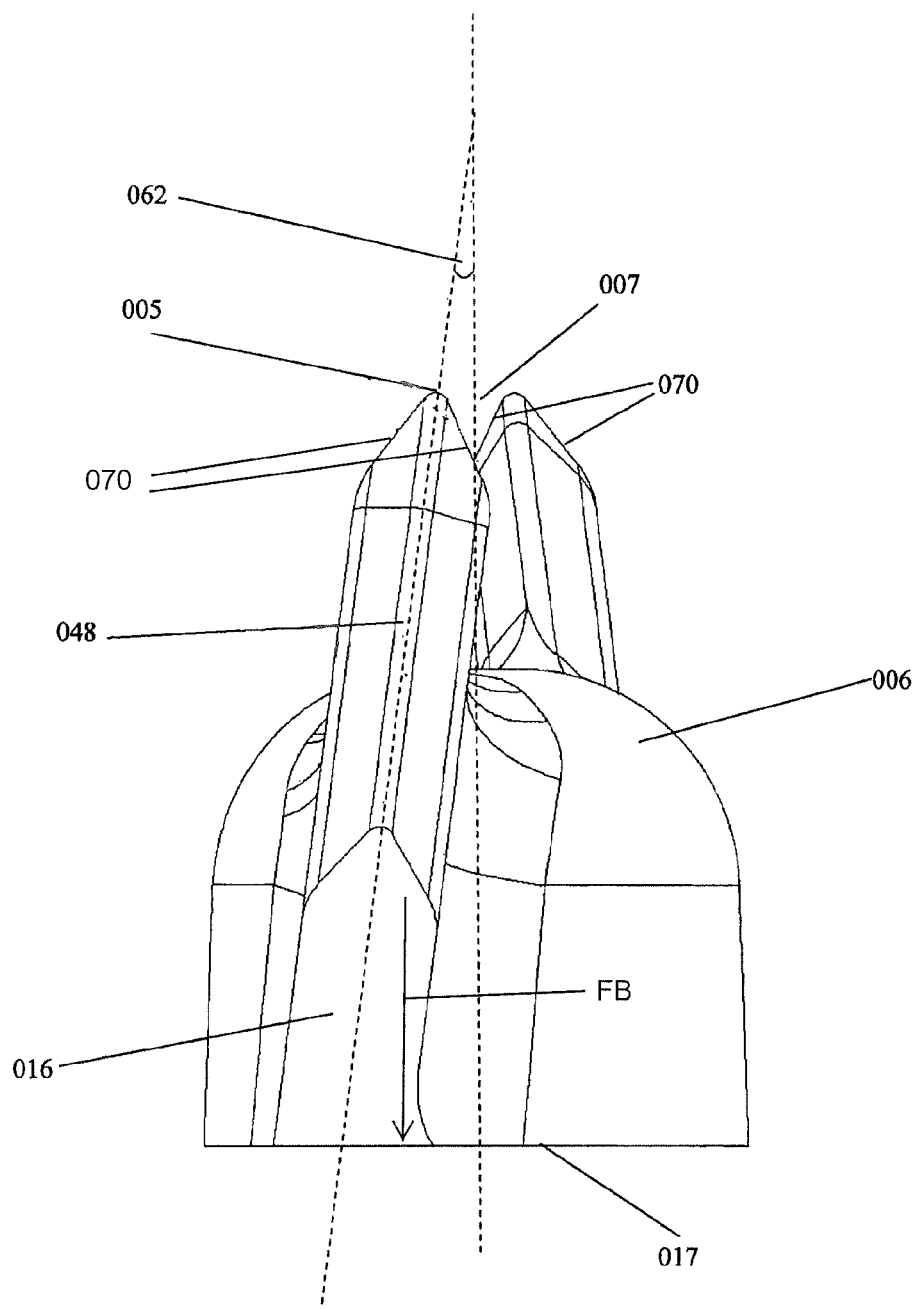
FIG. 3 is a side on view of the drive coupler.

As seen in FIG. 3, the arms 003 are at an angle 062, which in the illustrated embodiment is 7.5 degrees, from the axis of rotation 007, when seen in side view of FIG. 3, so that the engagement edge 005 is closer to the axis of rotation than the base 016. Whilst angles close to 7.5 degrees are a preferred embodiment for angle 062 angles up to 10 degrees are effective angles to use. This results in the engagement edge 005 leading the base 016 when rotating. With the angles 062 and 063, when the coupler 001 is rotating the rounded terminus 004 leads in the direction of rotation of the rest of the arm.

As illustrated in FIG. 4 the arms 003 have a base 016 that is at an angle 064 (of the order of 45 degrees) away from base 017 allowing the coupler 001 to be placed in a recess 008 as in FIG. 1 or 5 to account to for the shape of the 012 of the housing. The angled base 016 of the arms 003 also allows a reduction in the amount of material required to manufacture the coupler 001, reducing the cost of the piece.

Illustrated in FIG. 5 is the coupler 001 and motor housing 036 attached to the internal face of an appliance door 028. A removable ice bucket (not illustrated) sits in the space 022 abutting against the faces 028, 030, 014, 020 and 021.

The channel 038 formed by the faces 028, 030 and 031 is used to mount the motor housing 036, drive coupler enclosure 040 and ice bucket. The channel 038 on the internal face of the door of the refrigerator allows the drive coupler enclosure 040 and motor housing 036 to be easily accessed for servicing and or repair.

The ice bucket is fixed in the space 022 by the use of the protrusion 024 engaging in a recess in the ice bucket (not shown), the slots 032 and 033 engaging with part of the profile of the ice bucket and by the mating of the couplers 001 and 002 as described under FIG. 6. The hole 018 is designed to receive the final product of the ice bucket attached to the coupler 002, namely ice cubes or crushed ice.

FIG. 6 illustrates the drive mechanism 046 and the engagement of the drive and driven couplers 001 and 002. The device (an ice bucket here) 034 has on one face a driven coupler 002. The drive shaft 042 connects to the coupler 001 on the appliance at the base 017 of the coupler and defines the axis of rotation 007.

The driven coupler 002 connects to a drive shaft 043 in the ice bucket 034 that drives a mechanism in the device.

When the drive mechanism 046 is engaged, the coupler 001 located on the appliance has its axis of rotation aligned with that of driven coupler 002. The centre sections of the two mating couplers 001 and 002 are positioned so that the top faces 051 of the respective centre sections are spaced from each other and an engagement edge 005 of the arms project past an engagement edge 005 on the mated coupler 001.

When the two couplers 001 and 002 are engaged in this manner and operating, the coupler 001 will rotate around the axis of rotation and the drive surfaces 013 of the arms 003 on coupler 001 will be in contact with the drive surfaces 013 of the arms 003 of the coupler 002.

The contact of the drive surfaces 013, in addition to the rotational force supplied by the motor, result in the couplers 001 and 002 rotating to drive a device attached to the appliance. Ice crushing devices driven by a drive shaft of the motor are well known in the art and any compatible ice crusher can be used.

The rounded termini 004 and bevelled engagement edges 005 on the couplers 001 and 002 mean that when the couplers 001 and 002 are to be brought together and engagement edges 005 on opposing couplers are not in exact alignment the rounded termini and bevelled engagement edges inter-engaging will cause one or both of the couplers 001 or 002 to rotate allowing the arms to move past each other and engage in an operable condition. There remains one point, the highest point from the base 017 on the engagement edge 005 at the rounded terminus 004 that if the opposing couplers are in exact alignment will result in this point on the two mating couplers meeting, stopping mating engagement requiring the heads having to be adjusted to allow them to mate. With the inclusion of the bevelled or chamfered and radiused engagement edge 005 the range of angles for angular alignment to meet this condition will be greatly reduced when compared to a top edge that is not bevelled, chamfered and radiused or to one that does not have an angle 064 on the arms as in FIGS. 1 to 6.

When the couplers 001 and 002 are mated the drive surfaces 013 may not be abutted. For example the following faces 015 on both couplers 001 and 002 may be abutted or in close proximity prior to rotating. In this scenario the coupler 001 may need to rotate alone before the drive surfaces 013 are abutted to drive the driven coupler 002, if the drive surfaces 013 are not next adjacent to each other, to "take up the slack".

The offset angle 062 as illustrated in FIG. 3, results in the driving coupler 001 exerting a force vector FB towards the base 017 of the driving coupler 001 on the coupler 002. This aids to keep the device (ice bucket in this embodiment) attached to the coupler 001 driving the rotation, because the resulting force vector FB on the couplers will be in a direction that will urge the couplers together. This downward force is intensified when combined with the arms being at an angle 063 towards the bisecting radial line 060 as described above for FIG. 2.

The coupler 001 and coupler 002 can be made of stainless steel, or other materials such as polymeric material, or from a composite of steel and encapsulated polymeric material. However as forces on the arms can, if an ice crusher is attached as the device, have of the order of 20 Nm of torque transmitted through them, so appropriate material selection is required.

Figure 7:
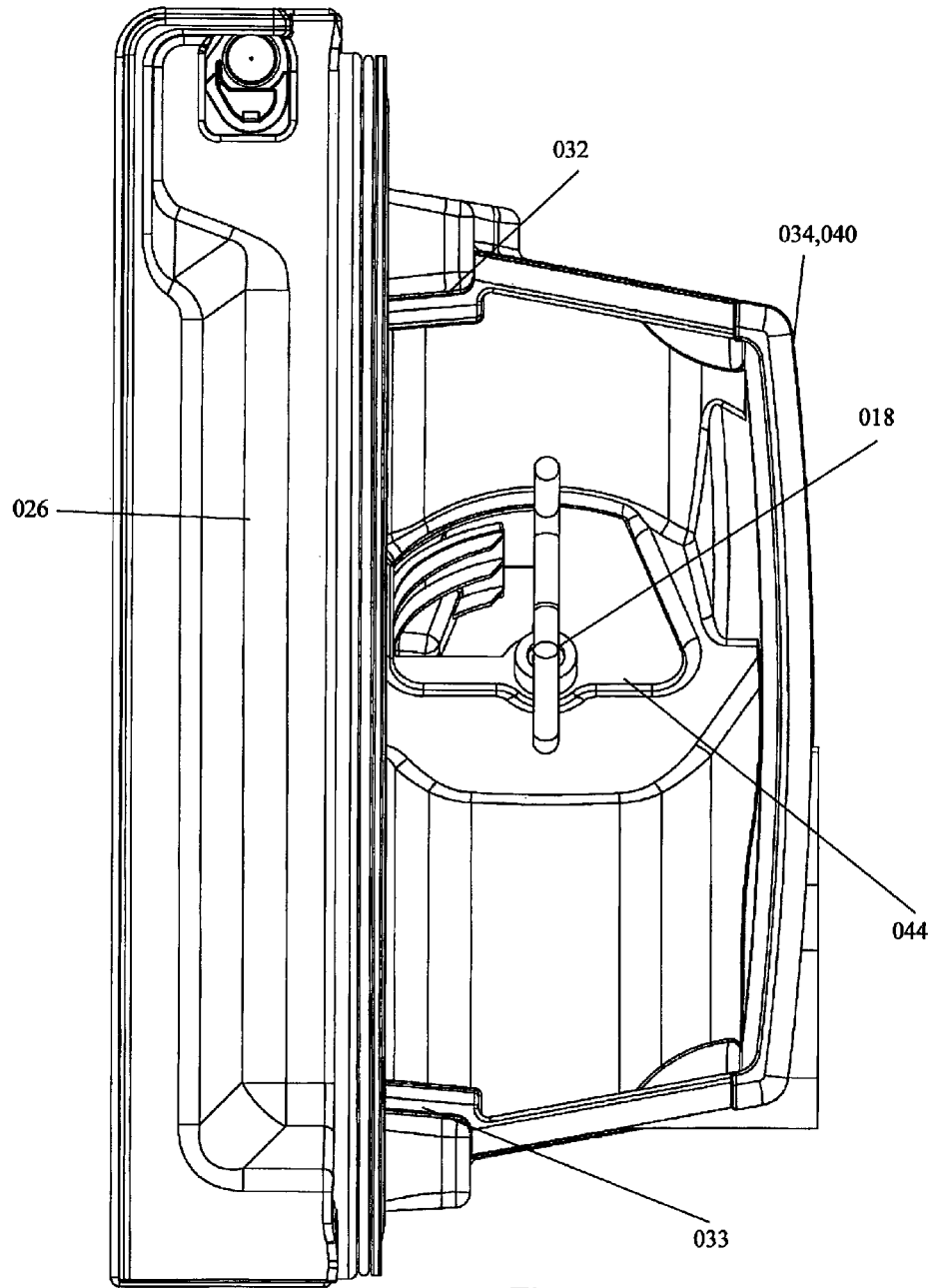
FIG. 7 is a top down view of an ice bucket engaged with a recess in the refrigerator door.

FIG. 7 is a plan view of an ice bucket 034 engaged with the drive coupling device (not shown) in the door of a refrigerator. A crushing mechanism 044 driven by the coupler 002 attached to the ice bucket and drive shaft 043 in the ice bucket 034 is shown. The crushing mechanism can be of any kind, driven by a drive shaft. The slots 032 and 033 are shown to be engaged with the profile of the ice bucket helping to keep the ice bucket fixed in place. The protrusion 024 and recess in the ice buckets are not shown here.

Figure 8:
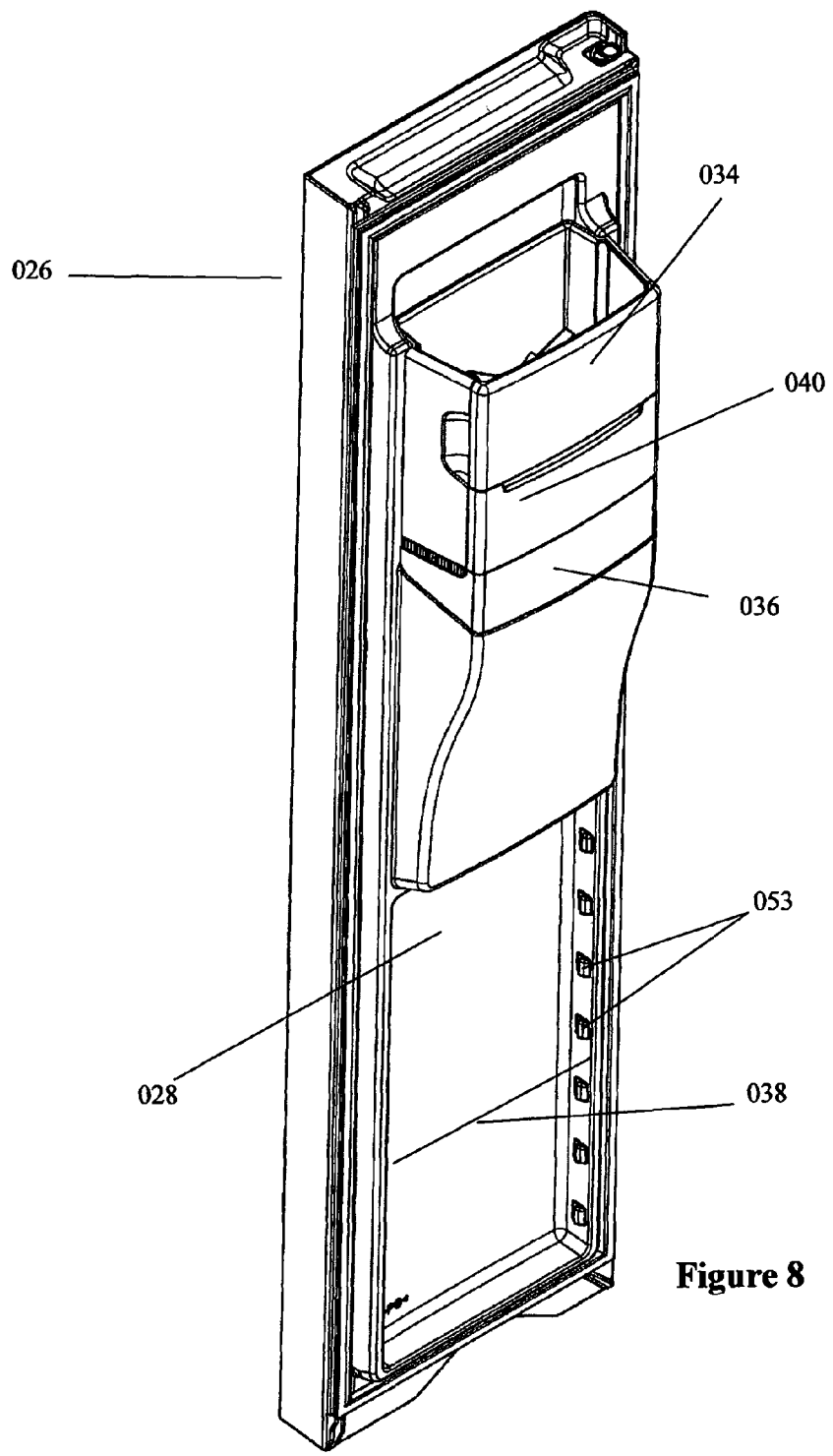
FIG. 8 is a perspective view of an ice bucket engaged with the recess in a refrigerator door.

FIG. 8 is a perspective view of a drive coupler engaged with an ice bucket in a refrigerator door. The ice bucket 034 receives pieces of ice, and below it is shown the drive coupler region 040 in the refrigerator door where the couplers 001 and 002 engage. Additionally, the motor housing 036 of the motor to drive the coupling device is located immediately below the region 040.

Figure 9:
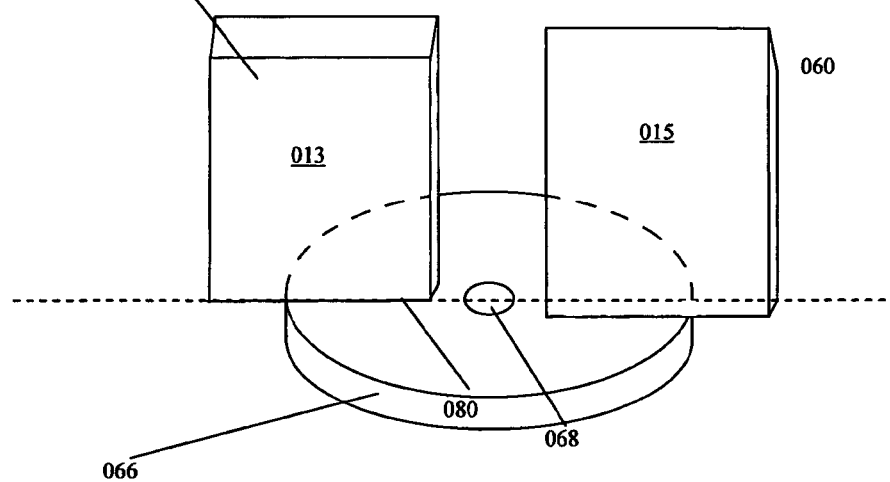
FIG. 9 is a perspective view of a drive coupler with a disk central section and a pair of arms.

In FIG. 9 is illustrated an embodiment of a coupler where the central section is in the form of a disk 066. In this embodiment disk 066 is attached to arms 074 by being welded along the edge 080, or they can be integrally formed, machined from a single piece of stock or made by casting or by other means. As described above the arms 074 are offset from the bisecting diametrical line 060. By having a disk 066, the base of the attached device (an ice bucket throughout the previous examples) can be brought closer to the face on which the coupler is mounted. In this arrangement less material is needed and the extension of the arms beyond the central section is reduced by comparison to previously described embodiments. The arms need not extend beyond the perimeter of the central section.

FIG. 10 illustrates an embodiment similar to that in FIG. 9 but with arms 076 of a rhomboid shape allowing for a reduction in the amount of material used due to the absence of material from those portions of the arms which will not engage a mating coupler, and by removal of material at the top end of the coupler. This will also facilitate the engagement of two couplers.

Figure 11:
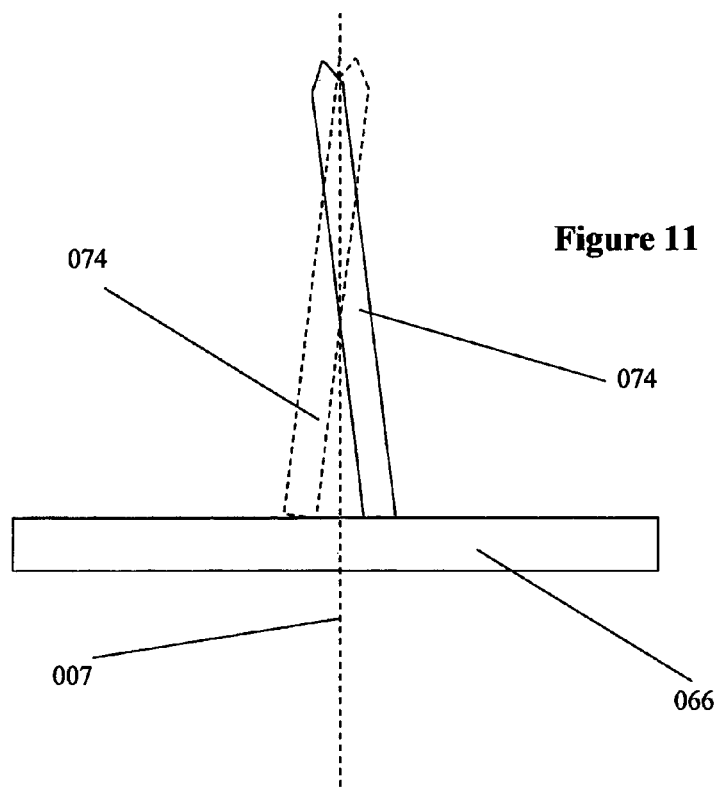
FIG. 11 is a side on view of the drive coupler of FIG. 10.

FIG. 11 is a side on view of the embodiments from FIGS. 9 and 10. As in FIG. 3 the arms are offset from the axis of rotation to place a force on the driven coupler to pull the ice crusher or other appliance towards the drive coupler.

FIG. 12 is an alternative embodiment of FIG. 9 where the arms are integrally formed with the central section.

Illustrated in FIGS. 13 and 14 are a plan view and a perspective view of a drive coupler similar to that of FIGS. 1 to 4 except that the angle 62 is not present in that the direction of extension of the arms is generally parallel to the axis of rotation when viewed from the outward end of the arms towards the hub.

By having the same coupler used as both the drive and driven coupler, a lesser inventory of parts need be kept by manufacturers and parts suppliers.

In this specification, reference to a document, disclosure, or other publication or use is not an admission that the document, disclosure, publication or use forms part of the common general knowledge of the skilled worker in the field of this invention at the priority date of this specification, unless otherwise stated.

In this specification, terms indicating orientation or direction, such as "up", "down", "vertical", "horizontal", "left", "right" "upright", "transverse" etc. are not intended to be absolute terms unless the context requires or indicates otherwise. These terms will normally refer to orientations shown in the drawings.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A coupler having a central section with an axis of rotation and arms extending away from said central section, said arms being in an offset location relative to a diametrical line, wherein a portion of said arms meet or pass through or extend along a plane formed through said diametrical line and said axis of rotation, said arms having an engagement edge positioned above a base edge in a direction parallel to the axis of rotation and being angled relative to the axis of rotation such that the engagement edge will lead when said coupler is driven and the base edge will trail.

2. A coupler as claimed in claim 1, wherein said arms are at an acute angle to said plane.

3. A coupler as claimed in claim 1, wherein said arms are oppositely offset along a diametrical line through said central section on opposite sides of said central section.

4. A coupler as claimed in claim 1 wherein the base edge of each of said arms of said coupler is angled relative to the axis of rotation so that a distal end of the base edge is at a height from a base of the coupler higher than a proximal end of said base edge.

5. A coupler as claimed in claim 1 that in operation rotates in the anti-clockwise direction and has a right hand thread through said axis of rotation; or in operation rotates in the clockwise direction and has a left hand thread through said axis of rotation.

6. A coupler as claimed in claim 1 wherein an edge of said arms is characterized by one or a combination of one or more of the following: said edge is beveled; said edge is chamfered; said edge is laterally radiused.

7. A coupler as claimed in claim 1 wherein said coupler is removably attached to a drive shaft.

8. A coupler as claimed in claim 1 wherein said coupler is made from a material selected from the group consisting of stainless steel, a polymeric material, and a composite material.

9. A coupler as claimed in claim 1 wherein said arms when rotating and engaging a like coupler, result in a force vector that has a component directed towards the axis of rotation of said coupler.

10. A coupler as claimed in claim 1 wherein said arms when rotating and engaging a like coupler, result in a force vector which will be in a direction that will urge said couplers together.

11. An appliance having an ice producing and dispensing system wherein said appliance has a detachable bin and a formation to receive said bin, said bin including thereon a first coupler as claimed in claim 1, which engages and is driven by a second coupler on said appliance, said second coupler also being as claimed in claim 1.

12. A drive mechanism including drive and driven couplers, said couplers being as claimed in claim 1, wherein in an operational state said central sections of both said drive and driven couplers are positioned such that the axes of rotation of both drive couplers are generally aligned; and said drive surfaces of the drive coupler abuts the drive surfaces of the driven coupler so that when operational said driven coupler is rotationally driven by the drive surface of said drive coupler.

13. A drive mechanism as claimed in claim 12 wherein edges of said arms of one coupler cause rotation of the other coupler, when they engage each other and when there is a misalignment of opposed coupler arms.

14. A coupler as claimed in claim 1, wherein said arms have a drive surface on the side of said arms closest to said plane.

15. A coupler as claimed in claim 1, wherein said arms include a space between ends of each arm.

16. A coupler as claimed in claim 1, wherein said engagement edge extends to a height from a base of the coupler which is higher than the height of said base to an upper portion of said central section.

17. A coupler as claimed in claim 1, wherein said engagement edge forms an angle with respect to the axis of rotation so that a distal end of the engagement edge is at a height from a base of the coupler which is higher than the height from the base of the coupler to a proximal end of said arm.

18. A coupler as claimed in claim 1, wherein said arms are angled so as to extend away from said central section towards said diametrical line.

* * * * *